United States Patent
Kudo et al.

[11] Patent Number: 5,725,433
[45] Date of Patent: Mar. 10, 1998

[54] BOOT ATTACHMENT STRUCTURE FOR ROTARY JOINT

[75] Inventors: Satoru Kudo; Kazuo Momiyama; Yasuhisa Nagayama, all of Mooka, Japan

[73] Assignee: Honda Giken Kogyo Kabushiki Kaisha, Tokyo, Japan

[21] Appl. No.: 558,756

[22] Filed: Nov. 20, 1995

[30] Foreign Application Priority Data

Nov. 24, 1994 [JP] Japan .................... 6-289617

[51] Int. Cl.$^6$ ................................. F16D 3/84
[52] U.S. Cl. ....................... 464/175; 277/212 FB
[58] Field of Search ...................... 464/173, 175; 277/37, 212 FB

[56] References Cited

U.S. PATENT DOCUMENTS

| | | | |
|---|---|---|---|
| 521,916 | 10/1894 | Martin et al. | 277/212 FB |
| 2,755,643 | 7/1956 | Wildhaber . | |
| 4,597,745 | 7/1986 | Orain | 464/173 |
| 4,673,188 | 6/1987 | Matsuno et al. | 277/212 FB |
| 4,693,484 | 9/1987 | Ukai et al. | 464/173 X |
| 4,878,389 | 11/1989 | Boge | 464/175 X |
| 4,927,678 | 5/1990 | Lallement | 464/175 X |
| 5,006,376 | 4/1991 | Arima | 464/175 X |
| 5,273,490 | 12/1993 | Stewart et al. | 464/173 |
| 5,295,914 | 3/1994 | Milavec . | |
| 5,451,186 | 9/1995 | Poulin et al. | 277/212 FB |

FOREIGN PATENT DOCUMENTS

| | | |
|---|---|---|
| 0157301 | 10/1985 | European Pat. Off. . |
| 0234155 | 9/1987 | European Pat. Off. . |
| 0464984 | 1/1992 | European Pat. Off. . |
| 2651286 | 3/1991 | France . |
| 1-28343 | 8/1989 | Japan . |
| 3-24898 | 5/1991 | Japan . |
| 4-128536 | 11/1992 | Japan . |
| 1486835 | 9/1973 | United Kingdom . |
| 2259349 | 3/1993 | United Kingdom . |
| 2282208 | 3/1995 | United Kingdom . |

*Primary Examiner*—Eileen A. Dunn
*Attorney, Agent, or Firm*—Birch, Stewart, Kolasch & Birch, LLP

[57] ABSTRACT

A housing has, on an outer circumferential surface thereof, a circumferential surface area, a toothed surface area complementary in shape to grooves and teeth of a boot of rubber, and a stopper engagable by tip ends of the boot of rubber and a boot of synthetic resin. The circumferential surface area, the toothed surface area, and the stopper are successively arranged in the order named in the direction in which the boots are installed onto a rotary joint. The housing has an outside diameter at the circumferential surface area which is equal to or greater than an inside diameter of the boot of synthetic resin. The circumferential surface area, circumferential teeth of the toothed surface area, and the stopper are progressively higher radially outwardly in the order named.

16 Claims, 9 Drawing Sheets

BOOT ATTACHMENT STRUCTURE FOR ROTARY JOINT

BACKGROUND OF THE INVENTION

1. Field of the Invention

The present invention relates to a boot attachment structure for allowing two bellows-shaped boots, e.g., a rubber boot and a synthetic resin boot, to be selectively attached to one rotary joint.

2. Description of the Related Art

Constant-velocity joints are generally used as rotary joints for transmitting rotary power from a driving shaft to a driven shaft on motor vehicles such as automobiles or the like. The constant-velocity joints are protected by a bellows-shaped boot which keeps the inner joint mechanism fluid-tight.

Specifically, a bellows-shaped boot has opposite ends fitted respectively over the housing (outer race) of a constant-velocity joint and a driven shaft connected to the constant-velocity joint. One known attachment structure by which a bellows-shaped boot is attached to a driven shaft is disclosed in Japanese utility model publication No. 1-28343, for example. The disclosed boot attachment structure has an annular groove defined in the driven shaft and an annular ridge disposed in the annular groove and having a height smaller than the depth of the annular groove, and an annular convex seal disposed on the boot and an annular recess defined in the annular convex seal and having a depth smaller than the height of the annular convex seal. The bellows-shaped boot is mounted on the driven shaft by fitting the annular convex seal in the annular groove with the annular ridge fitted in the annular recess.

Japanese utility model publication No. 3-24898 shows another boot attachment structure by which a boot is installed on a housing. According to the disclosed boot attachment structure, an annular ridge on the boot is fitted in a recess defined in an outer circumferential surface of the housing, and the boot is fastened to the outer circumferential surface of the housing by a fastening band.

To meet recent demands for boots with high-speed durability and temperature durability, there have been proposed boots of synthetic resin such as urethane or the like for use in place of conventional boots of rubber. Boots of rubber and boots of synthetic resin have widely different hardnesses and characteristics because of their different materials. The housings and shafts of rotary joints to be used with boots of rubber and boots of synthetic resin need to be shaped differently according to the materials of the boots.

The conventional boot attachment structures described above are composed of housings and shafts suitable for use with boots of rubber. If a boot of synthetic resin is used with a boot attachment structure, then the boot attachment structure is required to be composed of a housing and a shaft which are of a configuration suitable for such a boot of synthetic resin. See, for example, Japanese laid-open utility model publication No. 4-128536. Therefore, the rotary joint manufacturer has to manufacture two types of differently shaped rotary joints to be used respectively with boots of rubber and boots of synthetic resin. As a result, the productivity of rotary joints is low, and the process of manufacturing different rotary joints is complex and inefficient.

SUMMARY OF THE INVENTION

It is a general object of the present invention to provide a boot attachment structure which is versatile in use as it allows two types of bellows-shaped boots to be selectively attached to a single rotary joint, and allows rotary joints to be manufactured with high productivity.

A major object of the present invention is to provide a boot attachment structure which is capable of highly sealing and retaining a bellows-shaped boot.

Another object of the present invention is to provide a boot attachment structure which allows a bellows-shaped boot to be attached smoothly in place to a rotary joint and keeps the attached bellows-shaped boot reliably in intimate contact with the rotary joint.

The above and other objects, features, and advantages of the present invention will become apparent from the following description when taken in conjunction with the accompanying drawings in which preferred embodiments of the present invention are shown by way of illustrative examples.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
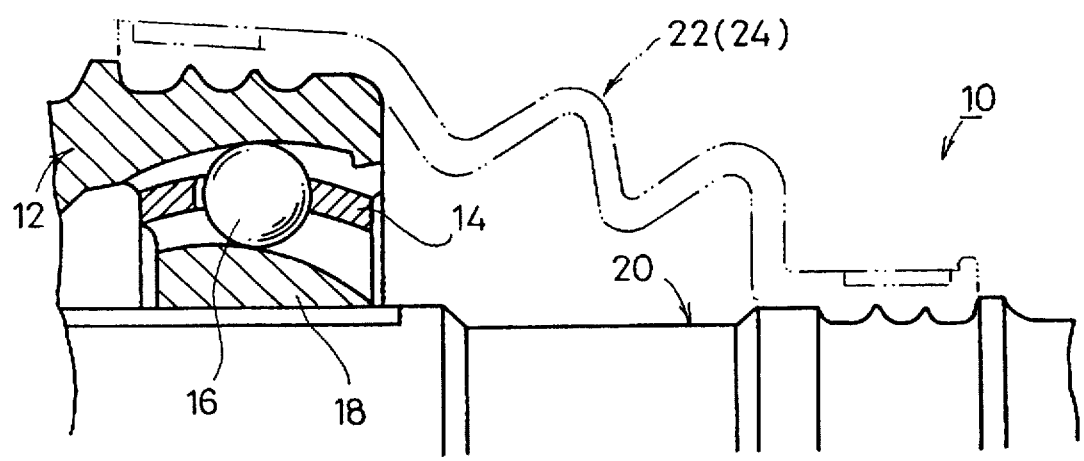
FIG. 1 is a fragmentary cross-sectional view of a constant-velocity joint incorporating a boot attachment structure according to a first embodiment of the present invention.

FIG. 1 shows a constant-velocity joint (rotary joint) 10 which incorporates a boot attachment structure according to a first embodiment of the present invention.

As shown in FIG. 1, the constant-velocity joint 10 has a housing 12 doubling as an outer race which houses a ball cage 14 supporting a plurality of balls 16 (only one shown). The balls 16 are held in rolling contact with an inner circumferential surface of the housing 12 and an outer circumferential surface of an inner race 18 which is positioned radially inwardly of the ball cage 14. A shaft 20 extends centrally through the inner race 18. Two types of bellows-shaped boots, i.e., a boot 22 of rubber and a boot 24 of synthetic resin, are selectively mounted on the shaft 20 and the housing 12.

Figure 2:
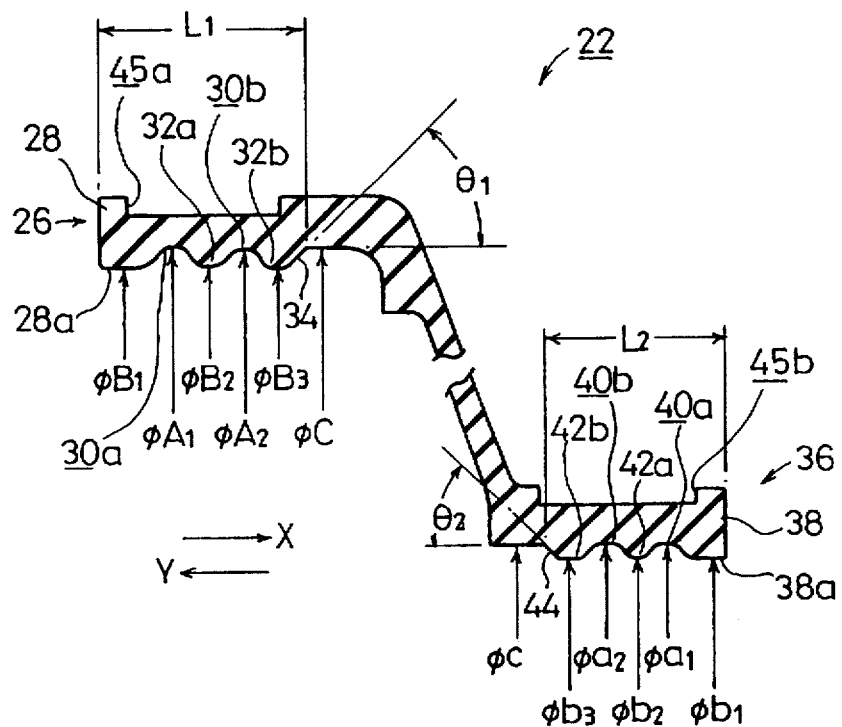
FIG. 2 is a fragmentary cross-sectional view of a boot of rubber which is used in the boot attachment structure according to the first embodiment.

As shown in FIG. 2, the boot 22 of rubber has a first attachment portion 26 to be mounted on the housing 12, the first attachment portion 26 including a radially outwardly engaging ridge 28 on its tip end. The first attachment portion 26 has, on its inner circumferential surface, two circumferential grooves 30a, 30b and two circumferential teeth 32a, 32b which alternate with each other axially over a predetermined length $L_1$. The tooth 32b which is positioned rearwardly of or behind the teeth 32a in the direction indicated by the arrow X on the inner circumferential surface of the first attachment portion 26 has a slanted surface 34 which is inclined at an angle $\theta_1$ radially outwardly in the rearward direction.

The first attachment portion 26 has inside diameters $A_1$, $A_2$ respectively at the grooves 30a, 30b, an inside diameter $B_1$ at an inner circumferential surface 28a of the engaging ridge 28, inside diameters $B_2$, $B_3$ respectively at the teeth 32a, 32b, and an inside diameter C positioned rearwardly of the slanted surface 34. These inside diameters $A_1$, $A_2$, $B_1$, $B_2$, $B_3$, and C are selected as described later on.

The boot 22 of rubber also has a second attachment portion 36 to be mounted on the shaft 20, the second attachment portion 36 includes a radially outwardly engaging ridge 38 on its tip end. The second attachment portion 36 has, on its inner circumferential surface, two circumferential grooves 40a, 40b and two circumferential teeth 42a, 42b which alternate with each other axially over a predetermined length $L_2$. The tooth 42b which is positioned rearwardly of or behind the tooth 42a in the direction indicated by the arrow Y on the inner circumferential surface of the second attachment portion 36 has a slanted surface 44 which is inclined at an angle $\theta_2$ radially outwardly in the rearward direction.

The second attachment portion 36 has inside diameters $a_1$, $a_2$ respectively at the grooves 40a, 40b, an inside diameter $b_1$ at an inner circumferential surface 38a of the ridge 38, inside diameters $b_2$, $b_3$ respectively at the teeth 42a, 42b, and an inside diameter c rearward of the slanted surface 44. These inside diameters $a_1$, $a_2$, $b_1$, $b_2$, $b_3$, and c are selected as described later on.

The first and second attachment portions 26, 36 of the boot 22 of rubber have respective band attachment slots 45a, 45b of predetermined widths defined respectively in outer circumferential surfaces thereof.

The first and second attachment portions 26, 36 of the boot 22 of rubber are integrally interconnected by a radially slanted portion.

Figure 3:
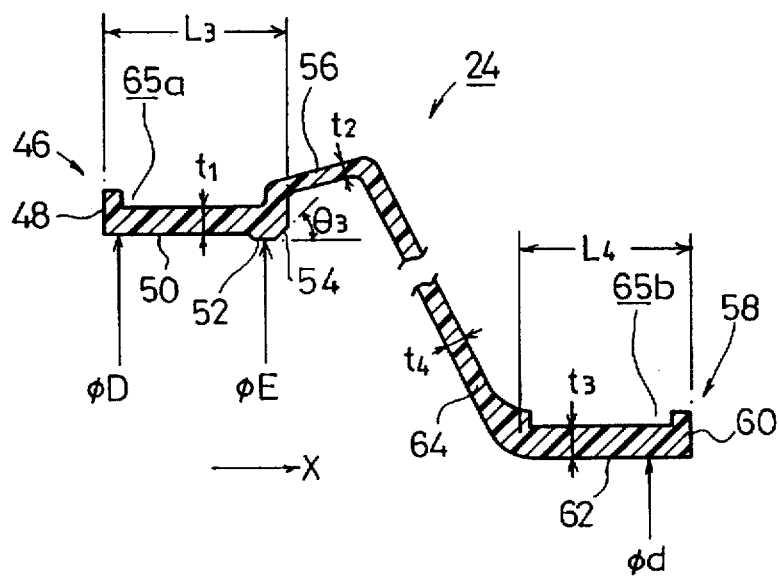
FIG. 3 is a fragmentary cross-sectional view of a boot of synthetic resin which is used in the boot attachment structure according to the first embodiment.

As shown in FIG. 3, the boot 24 of synthetic resin has a first attachment portion 46 to be mounted on the housing 12, the first attachment portion 46 including a radially outward engaging ridge 48 on its tip end. The first attachment portion 46 extends axially over a predetermined length $L_3$. The first attachment portion 46 has a smooth inner circumferential attachment surface 50 and a circumferential tooth 52 at an axial inner edge thereof. The circumferential tooth 52 has a slanted surface 54 which is inclined at an angle $\theta_3$ radially outwardly in the rearward direction. The first attachment portion 46 has a thickness $t_1$ which is greater than the thickness $t_2$ of a radially slanted portion 56 of the boot 24 ($t_1 > t_2$), for the boot 24 of synthetic resin to maintain a desired level of sealing capability and flexibility.

The boot 24 of synthetic resin also has a second attachment portion 58 to be mounted on the shaft 20, the second attachment portion 58 including a radially outward engaging ridge 60 on its tip end. The second attachment portion 58 has a smooth inner circumferential attachment surface 62 which extends axially over a predetermined length $L_4$. The boot 24 of synthetic resin has an inside diameter d, as described later on, at the smooth inner circumferential attachment surface 62. The second attachment portion 58 has a thickness $t_3$ which is greater than the thickness $t_4$ of a radially slanted portion 64 of the boot 24 ($t_3 > t_4$).

The first and second attachment portions 46, 58 of the boot 24 of synthetic resin have respective band attachment slots 65a, 65b of predetermined widths defined respectively in outer circumferential surfaces thereof.

The first and second attachment portions 46, 58 of the boot 24 of synthetic resin are integrally interconnected by the radially slanted portions 56, 64.

Figure 4:
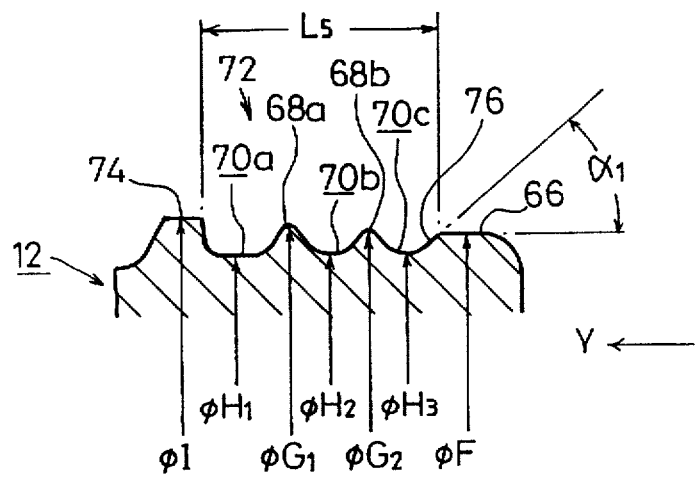
FIG. 4 is a fragmentary cross-sectional view of a housing of the constant-velocity joint.

As shown in FIG. 4, the housing 12 has, on its outer circumferential surface, a circumferential surface area 66, a toothed surface area 72 composed of two circumferential teeth 68a, 68b and three circumferential grooves 70a, 70b, 70c, which alternate with each other axially over a predetermined length $L_5$, corresponding to the first attachment portion 26 of the boot 22 of rubber or the first attachment portion 46 of the boot 24 of synthetic resin, and a stopper 74 engagable by the engaging ridge 28 of the boot 22 of rubber or the engaging ridge 48 of the boot 24 of synthetic resin. The circumferential surface area 66, the toothed surface area 72, and the stopper 74 are successively arranged in the order named in the direction indicated by the arrow Y, i.e., in the direction in which the boot 22 or 24 is installed onto the constant-velocity joint 10.

The teeth 68a, 68b correspond respectively to the grooves 30a, 30b of the first attachment portion 26 of the boot 22 of rubber, and the grooves 70a, 70b, 70c correspond respectively to the inner circumferential surface 28a and the teeth 32a, 32b of the first attachment portion 26. The housing 12 also has an engaging slanted surface 76 extending axially between the circumferential surface area 66 and the groove 70c which is inclined at an angle $\alpha_1$.

The housing 12 has an outside diameter F at the circumferential surface area 66, outside diameters $G_1$, $G_2$ respectively at the teeth 68a, 68b, outside diameters $H_1$, $H_2$, $H_3$ respectively at the grooves 70a, 70b, 70c, and an outside diameter I at the stopper 74. These diameters F, $G_1$, $G_2$, $H_1$, $H_2$, $H_3$, I are selected to satisfy the following relationship: The outside diameter F at the circumferential surface area 66 is equal to or greater than the inside diameter D at the smooth inner circumferential attachment surface 62 of the boot 24 of synthetic resin (F≧D). The outside diameter I at the stopper 74 is greater than the outside diameter $G_1$ at the tooth 68a, the outside diameter $G_1$ at the tooth 68a is equal to the outside diameter $G_2$ at the tooth 68b, and the outside diameter $G_2$ at the tooth 68b is greater than the outside diameter F at the circumferential surface area 66 (I>$G_1$=$G_2$>F). Therefore, the circumferential surface area 66, the tooth 68b, the tooth 68a, and the stopper 74 are generally progressively higher radially outwardly in the order named.

The relationship between the housing 12 and the first attachment portion 26 of the boot 22 of rubber is expressed by the equations (1) given below, and the relationship between the housing 12 and the first attachment portion 46 of the boot 24 of synthetic resin is expressed by the equations (2) given below.

$$H_1=H_2=H_3 \geq B_1=B_2=B_3,$$

$$G_1=G_2>A_1=A_2, F \geq C,$$

$$\alpha_1=\theta_1, L_1=L_5 \quad (1)$$

$$F>E, F \geq D, L_5=L_3, \alpha_1=\theta_3 \quad (2)$$

Figure 5:
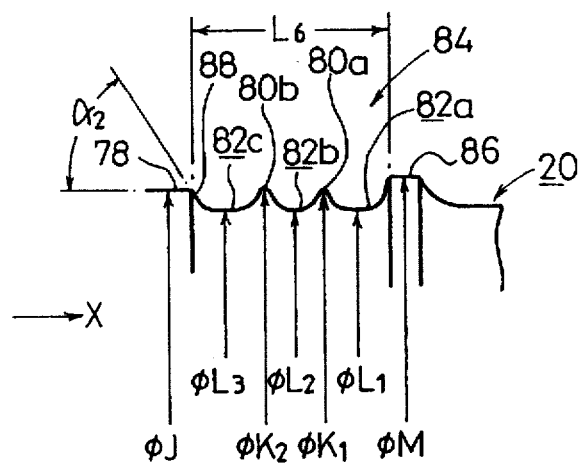
FIG. 5 is a fragmentary view of a shaft of the constant-velocity joint.

As shown in FIG. 5, the shaft 20 has, on its outer circumferential surface, a first large-diameter circumferential surface area 78, a toothed surface area 84 composed of two circumferential teeth 80a, 80b and three circumferential grooves 82a, 82b, 82c, which alternate with each other axially over a predetermined length $L_6$, corresponding to the second attachment portion 36 of the boot 22 of rubber or the second attachment portion 58 of the boot 24 of synthetic resin, and a second large-diameter circumferential surface area 86 engagable by the engaging ridge 38 of the boot 22 of rubber or the engaging ridge 60 of the boot 24 of synthetic resin. The first large-diameter circumferential surface area 78, the toothed surface area 84, and the second large-diameter circumferential surface area 86 are successively arranged in the order named in the direction indicated by the arrow X, i.e., in the direction in which the boot 22 or 24 is installed onto the constant-velocity joint 10.

The teeth 80a, 80b correspond respectively to the grooves 40a, 40b of the second attachment portion 36 of the boot 22 of rubber, and the grooves 82a, 82b, 82c correspond respectively to the inner circumferential surface 38a and the teeth 42a, 42b of the second attachment portion 36. The shaft 20 also has an engaging slanted surface 88 extending axially between the first large-diameter circumferential surface area 78 and the toothed surface area 84, and inclined at an angle $\alpha_2$.

The shaft 20 has an outside diameter J at the first large-diameter circumferential surface area 78, outside diameters $K_1$, $K_2$ respectively at the teeth 80a, 80b, outside diameters $L_1$, $L_2$, $L_3$ respectively at the grooves 82a, 82b, 82c, and an outside diameter M at the second large-diameter circumferential surface area 86. These diameters J, $K_1$, $K_2$, $L_1$, $L_2$, $L_3$, M are selected to satisfy the relationship represented by the following equations (3):

$$M>K_1=K_2>J,$$

$$L_1=L_2=L_3 \quad (3)$$

The relationship between the shaft 20 and the second attachment portion 36 of the boot 22 of rubber is expressed by the equations (4) given below, and the relationship between the shaft 20 and the second attachment portion 58 of the boot 24 of synthetic resin is expressed by the equations (5) given below.

$$L_1=L_2=L_3 \geq b_1=b_2=b_3,$$

$$K_1=K_2>a_1=a_2, J \geq c,$$

$$\alpha_2=\theta_2, L_6=L_2 \quad (4)$$

$$J>d, L_6=L_4 \quad (5)$$

A process of installing the boot 22 of rubber onto the constant-velocity joint 10 will be described below.

Figure 6:
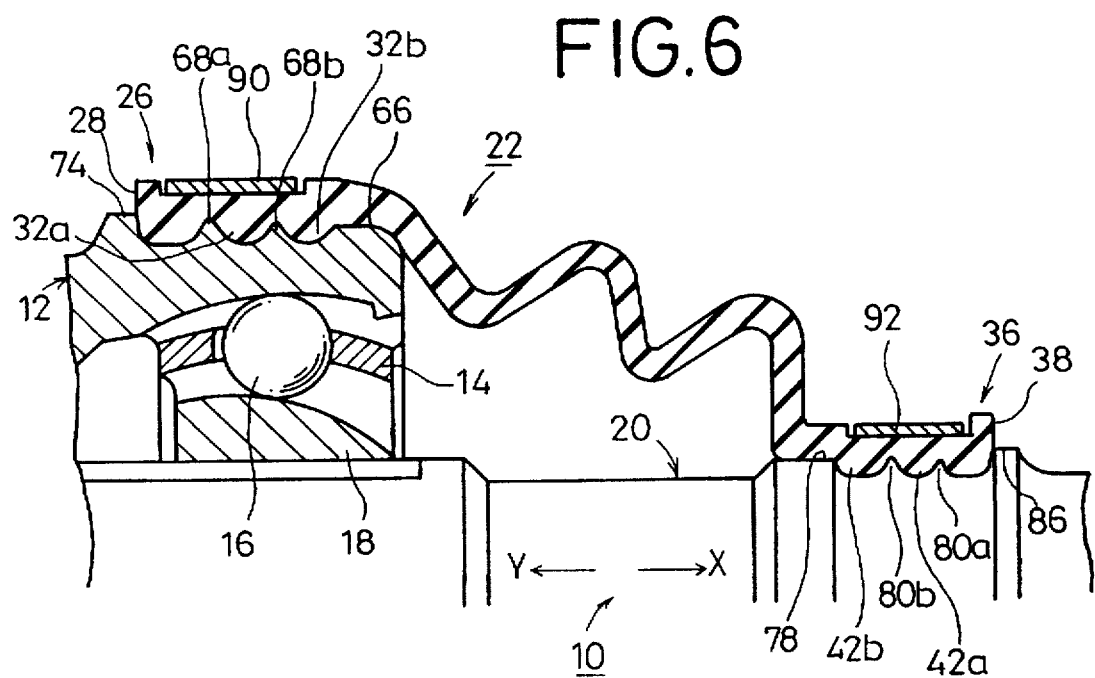
FIG. 6 is a fragmentary cross-sectional view showing the boot of rubber mounted on the housing and the shaft.

When the first attachment portion 26 of the boot 22 of rubber shown in FIG. 2 is placed over the outer circumferential surface of the housing 12 shown in FIG. 4 in the direction indicated by the arrow Y, since the circumferential surface area 66, the tooth 68b, the tooth 68a, and the stopper 74 on the outer circumferential surface of the housing 12 are generally progressively higher radially outwardly in the order named in the direction indicated by the arrow Y, the first attachment portion 26 is smoothly fitted over the outer circumferential surface of the housing 12 until the engaging ridge 28 engages the stopper 74 (see FIG. 6). Therefore, the inner circumferential surface 28a of the engaging ridge 28 is fitted in and positioned by the groove 70a of the housing 12, the teeth 32a, 32b of the first attachment portion 26 are fitted in the respective grooves 70b, 70c of the housing 12, and the teeth 68a, 68b of the housing 12 are fitted in the respective grooves 30a, 30b of the first attachment portion 26.

Then, a fastening band 90 is mounted in the band attachment groove 45a in the outer circumferential surface of the first attachment portion 26, and then tightened. The outer circumferential surface of the housing 12 and the inner circumferential surface of the first attachment portion 26 are now pressed against each other, so that the boot 22 of rubber is firmly attached to the housing 12 while it can sufficiently be sealed and retained against removal.

Since the slanted surface 34 of the first attachment portion 26 and the engaging slanted surface 76 of the housing 12 are inclined at the same angle ($\theta_1=\alpha_1$), the first attachment portion 26 and the housing 12 are securely held in intimate contact with each other, so that the boot 22 of rubber can effectively be retained against dislodgment.

When the second attachment portion 36 of the boot 22 of rubber is placed over the outer circumferential surface of the shaft 20 shown in FIG. 5 in the direction indicated by the arrow X, since the engaging ridge 38 engages the second large-diameter circumferential surface area 86, and the inner circumferential surface 38a of the engaging ridge 38 is fitted in and positioned by the groove 82a of the shaft 20.

At this time, the teeth 42a, 42b of the second attachment portion 36 are fitted in the respective grooves 82b, 82c of the shaft 20, and the teeth 80a, 80b of the shaft 20 are fitted in the respective grooves 40a, 40b of the second attachment portion 36.

Then, a fastening band 92 is mounted in the band attachment groove 45b in the outer circumferential surface of the second attachment portion 36, and then tightened. The second attachment portion 36 is now pressed against the shaft 20 in intimate contact therewith.

A process of installing the boot 24 of synthetic resin onto the constant-velocity joint 10 will be described below.

When the first attachment portion 46 of the boot 24 of synthetic resin shown in FIG. 3 is placed over the outer circumferential surface of the housing 12 shown in FIG. 4 in the direction indicated by the arrow Y, the engaging ridge 48 of the first attachment portion 46 engages the stopper 74 of the housing 12 and is positioned thereby, and the tooth 52 of the first attachment portion 46 is fitted in and positioned by the groove 70c of the housing 12. Since the inside diameter D at the attachment surface 50 of the first attachment portion 46 is equal to or smaller than the outside diameter F at the circumferential surface area 66 of the housing 12, and the circumferential surface area 66, the teeth 68a, 68b, and the stopper 74 are generally progressively higher radially outwardly in the order named in the direction indicated by the arrow Y, the first attachment portion 46 is press-fitted over the housing 12 while being slightly expanded due to its elasticity when the first attachment portion 46 is pushed in the direction indicated by the arrow Y.

Figure 7:
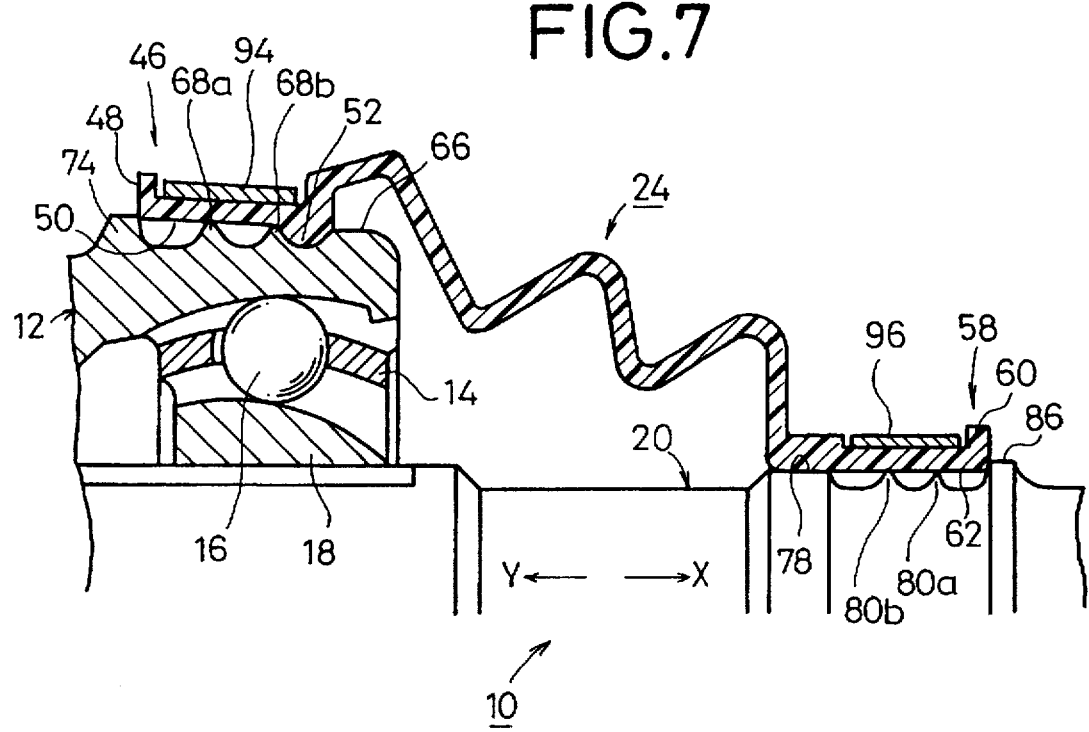
FIG. 7 is a fragmentary cross-sectional view showing the boot of synthetic resin mounted on the housing and the shaft.

Then, a fastening band 94 is mounted in the band attachment groove 65a in the outer circumferential surface of the first attachment portion 46. When the fastening band 94 is tightened, the first attachment portion 46 of the boot 24 of synthetic resin is firmly mounted on the outer circumferential surface of the housing 12 while being securely sealed (see FIG. 7).

Since the slanted surface 54 of the first attachment portion 46 and the engaging slanted surface 76 of the housing 12 are inclined at the same angle, the first attachment portion 46 and the housing 12 are securely held in intimate contact with each other, so that the boot 24 of synthetic resin can effectively be retained against dislodgment.

When the second attachment portion 58 of the boot 24 of synthetic resin is placed over the outer circumferential surface of the shaft 20 in the direction indicated by the arrow X, the engaging ridge 60 engages the second large-diameter circumferential surface area 86. Inasmuch as the inside diameter d at the attachment surface 62 of the second attachment portion 58 is equal to or smaller than the outside diameter J at the first large-diameter circumferential surface area 78 of the shaft 20, and the first large-diameter circumferential surface area 78, the teeth 80a, 80b, and the second large-diameter circumferential surface area 86 are generally progressively higher radially outwardly in the order named in the direction indicated by the arrow X, the teeth 80a, 80b bite into the attachment surface 62 when the second attachment portion 58 is pushed in the direction indicated by the arrow X, so that the second attachment portion 58 can firmly be fixed to the shaft 20. Thereafter, a fastening band 96 is mounted in the band attachment groove 65b in the outer circumferential surface of the second attachment portion 58, and then tightened.

In the first embodiment described above, the housing 12 has on its outer circumferential surface the toothed surface area 72 complementary in shape to the first attachment portion 26 of the boot 22 of rubber, and the circumferential surface area 66, the teeth 68a, 68b, and the stopper 74 are generally progressively higher radially outwardly in the order named. Furthermore, the outside diameter F at the circumferential surface area 66 is equal to or greater than the inside diameter D at the attachment surface 50 of the first attachment portion 46 of the boot 24 of synthetic resin.

Consequently, it is possible to selectively attach the boot 22 of rubber and the boot 24 of synthetic resin, whose first attachment portions 26, 46 have different shapes, to the same housing 12. Therefore, the boot attachment structure is more versatile in use and can be manufactured with higher productivity than conventional boot attachment structures which require housings dedicated respectively to the boot 22 of rubber and the boot 24 of synthetic resin.

The shaft 20 has on its outer circumferential surface the toothed surface area 84 complementary in shape to the second attachment portion 36 of the boot 22 of rubber, and the first large-diameter circumferential surface area 78, the teeth 80a, 80b, and the second large-diameter circumferential surface area 86 are generally progressively higher radially outwardly in the order named. Furthermore, the outside diameter J at the first large-diameter circumferential surface area 78 is equal to or greater than the inside diameter D at the attachment surface 62 of the second attachment portion 58 of the boot 24 of synthetic resin. Consequently, it is possible to selectively attach the boot 22 of rubber and the boot 24 of synthetic resin, which are different in material and shape, to the same shaft 20.

A boot attachment structure according to a second embodiment of the present invention will be described below in relation to a constant-velocity joint 10a with reference to FIGS. 8 through 12. Those parts of the boot attachment structure according to the second embodiment which are identical to those of the boot attachment structure according to the first embodiment are denoted by identical reference characters, and will not be described in detail below.

Figure 8:
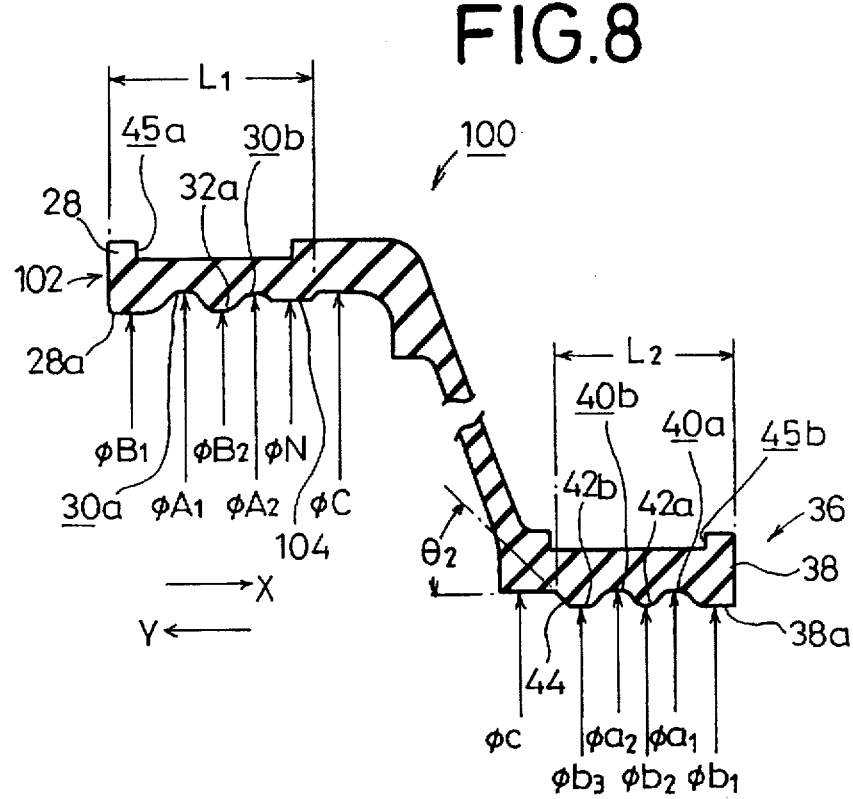
FIG. 8 is a fragmentary cross-sectional view of a boot of rubber which is used in a boot attachment structure according to a second embodiment of the present invention.

As shown in FIG. 8, a boot 100 of rubber has a first attachment portion 102 including a circumferential land 104 on its inner circumferential surface which is positioned rearwardly of the tooth 32a. The circumferential land 104 is shown as flat, but may be of the same shape as the tooth 32a. The first attachment portion 102 has an inside diameter N at the circumferential land 104, which is selected as described later on.

Figure 9:
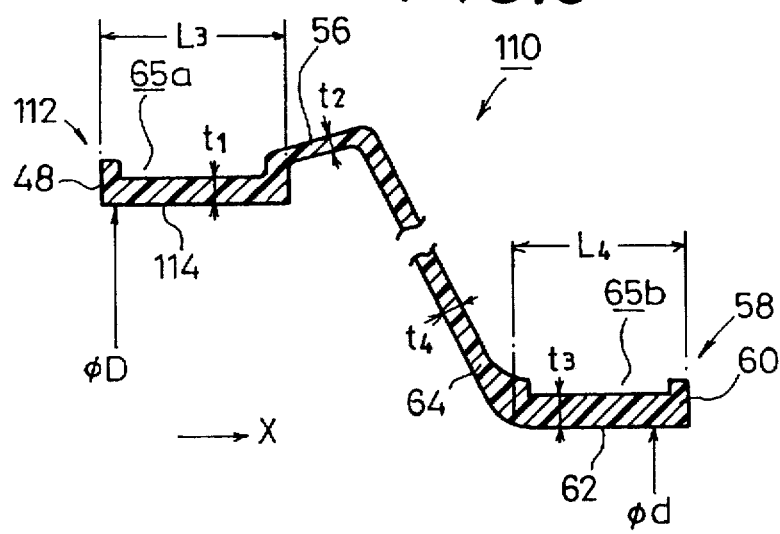
FIG. 9 is a fragmentary cross-sectional view of a boot of synthetic resin which is used in the boot attachment structure according to the second embodiment.

As shown in FIG. 9, a boot 110 of synthetic resin has a first attachment portion 112 having a smooth inner circumferential attachment surface 114 extending axially over a predetermined length $L_3$.

Figure 10:
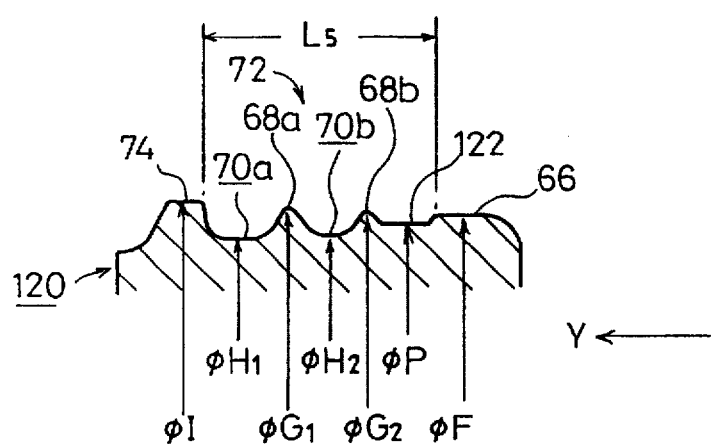
FIG. 10 is a fragmentary cross-sectional view of a housing which is used in the boot attachment structure according to the second embodiment.

As shown in FIG. 10, a housing 120 has a circumferential recess 122 defined in its outer circumferential surface between the circumferential surface area 66 and the toothed surface area 72, for receiving the circumferential land 104 of the boot 100 of rubber. The circumferential recess 122 is of a flat or tooth-like shape complementary to the circumferential land 104. The housing 120 has an outside diameter P at the circumferential recess 122 which is of a dimension between the outside diameter $H_2$ at the groove 70b of the toothed surface area 72 and the outside diameter F at the circumferential surface area 66 ($F>P>H_1=H_2$).

The relationship between the housing 120 and the first attachment portion 102 of the boot 100 of rubber is represented by the equations (6) given below, and the relationship between the housing 120 and the first attachment portion 112 of the boot 110 of synthetic resin is represented by the equations (7) given below.

$$H_1=H_2 \geq B_1=B_2, \ P \geq N, \ L_1=L_5,$$

$$G_1=G_2>A_1=A_2, \ F \geq C, \tag{6}$$

$$F \geq D, \ L_5=L_3 \tag{7}$$

Figure 11:
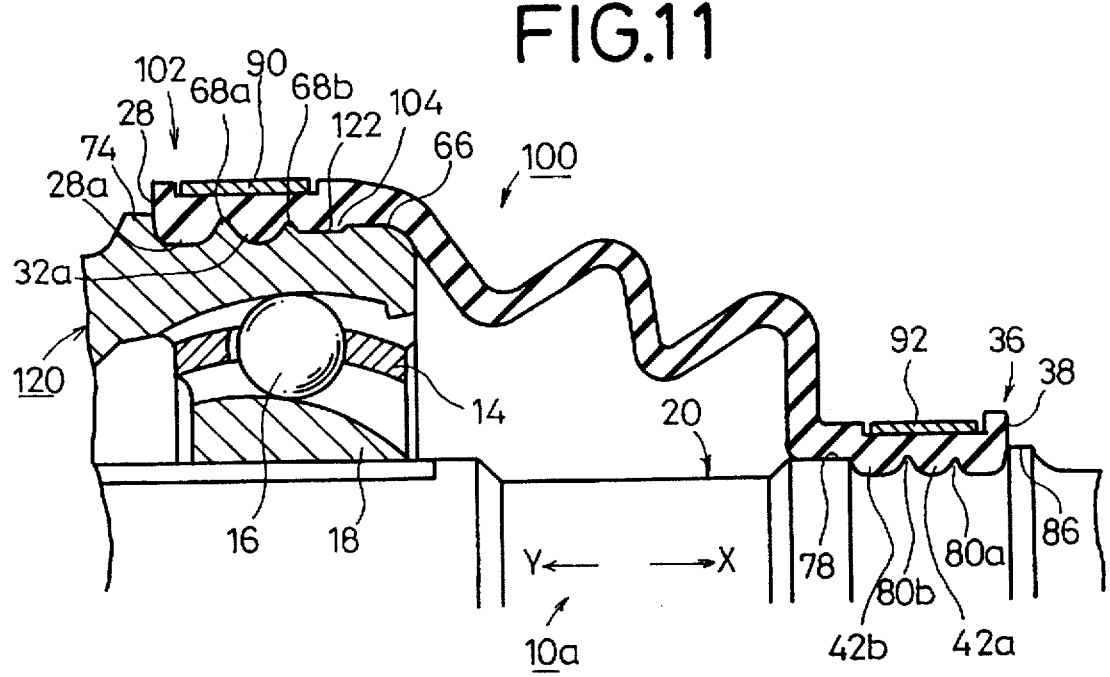
FIG. 11 is a fragmentary cross-sectional view showing the boot of rubber mounted on the housing and a shaft used in the boot attachment structure according to the second embodiment.

When the boot 100 of rubber is installed on the housing 120, as shown in FIG. 11, the engaging ridge 28 engages and is positioned by the stopper 74, the inner circumferential surface 28a of the engaging ridge 28 and the tooth 32a are fitted respectively in the grooves 70a, 70b (see FIG. 10) of the housing 120, the circumferential land 104 is fitted in the circumferential recess 122, and the teeth 68a, 68b are fitted respectively in the grooves 30a, 30b.

Figure 12:
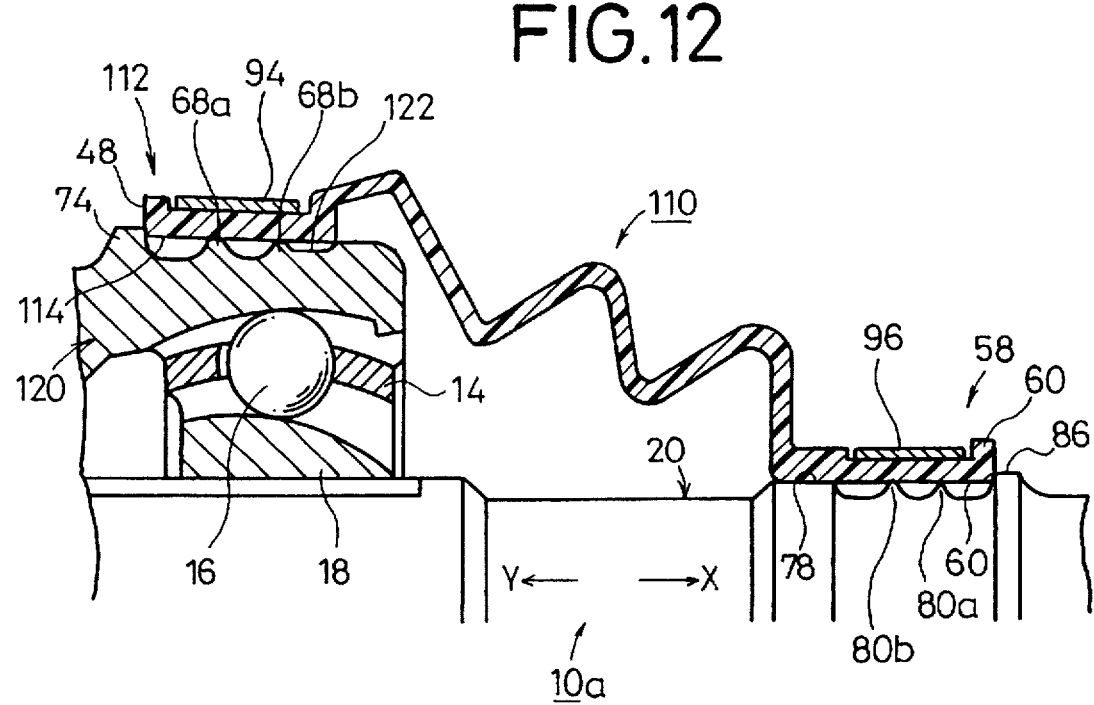
FIG. 12 is a fragmentary cross-sectional view showing the boot of synthetic resin mounted on the housing and the shaft used in the boot attachment structure according to the second embodiment.

When the boot 110 of synthetic resin is installed on the housing 120, as shown in FIG. 12, the engaging ridge 48 engages and is positioned by the stopper 74. Upon tightening the fastening band 94, the teeth 68a, 68b bite into the attachment surface 114 of the first attachment portion 112, so that the boot 110 of synthetic resin can firmly be mounted on the housing 120.

The outside diameter P at the circumferential recess 122 of the housing 120 is of a dimension between the outside diameter $H_2$ at the groove 70b of the toothed surface area 72 and the outside diameter F at the circumferential surface area 66. Therefore, the gap between the attachment surface 114 of the first attachment portion 112 and the bottom of the circumferential recess 122 is small enough to keep the boot 110 of synthetic rubber sealed effectively with respect to the housing 120.

The boot 100 of rubber and the boot 110 of synthetic rubber can be installed on the shaft 20 in the same manner as the boot 22 of rubber and the boot 24 of synthetic rubber are installed on the shaft 20.

According to the second embodiment, as described above, the two different types of boots, i.e., the boot 100 of rubber and the boot 110 of synthetic rubber, can selectively be mounted securely on the same housing 120 and shaft 20. The boot attachment structure according to the second embodiment offers the same advantages as those of the boot attachment structure according to the first embodiment.

Although certain preferred embodiments of the present invention have been shown and described in detail, it should be understood that various changes and modifications may be made therein without departing from the scope of the appended claims.

What is claimed is:

1. A boot structure in combination with a rotary joint, comprising:

a rotary joint comprising a housing and a shaft;

a bellows-shaped boot adapted to be installed on said housing and said shaft of the rotary joint;

an attachment portion of said bellows-shaped boot being mounted on an outer circumferential surface of the housing;

the outer circumferential surface of said housing including a circumferential surface area, a toothed surface area composed of circumferential teeth and circumferential grooves, and a stopper engageable by a tip end of said attachment portion of said bellows-shaped boot, said circumferential surface area, said toothed surface area and said stopper being successively arranged in that named order in a direction in which the bellows-shaped boot is installed onto the rotary joint; and an outside diameter of said housing being disposed at said circumferential surface area which is at least equal to a smallest inside diameter of said bellows-shaped boot at the attachment portion thereof, said circumferential surface area, said circumferential teeth of the toothed surface area and said stopper having diameters that are progressively greater in that named order.

2. The combination according to claim 1, wherein said attachment portion of said bellows-shaped boot includes circumferential grooves and circumferential teeth defined on an inner circumferential surface thereof complementary to said circumferential grooves and said circumferential teeth of the toothed surface area of said housing.

3. The combination according to claim 2, wherein one of said teeth of said bellows-shaped boot, positioned adjacent to another of said teeth of said bellows-shaped boot, includes a slanted surface inclined rearwardly at a predetermined angle, said housing having an engaging slanted surface extending between said circumferential surface area and one of said circumferential grooves of said toothed surface area, said engaging slanted surface being complementary to said slanted surface.

4. The combination according to claim 2, wherein said attachment portion of said bellows-shaped boot has a circumferential land positioned on the inner circumferential surface adjacent to said teeth thereof and having an inside diameter greater than the inside diameter of said teeth, said housing having a circumferential recess positioned on the outer circumferential surface between said circumferential surface area and said toothed surface area, said housing having an outside diameter at said circumferential recess, which is of a dimension between an outside diameter at one of said grooves of said toothed surface area of the housing and the outside diameter at said circumferential surface area.

5. The combination according to claim 1, wherein said attachment portion of said bellows-shaped boot comprises a smooth inner circumferential surface having a constant inside diameter.

6. The combination according to claim 5, further comprising a circumferential tooth disposed adjacent to said smooth inner circumferential surface, said circumferential tooth having a slanted surface inclined rearwardly at a predetermined angle said housing having an engaging slated surface extending between said circumferential surface area and one of said circumferential grooves of said toothed surface area, said engaging slanted surface being complementary to said slanted surface.

7. The combination according to claim 5, wherein said bellows-shaped boot has a band attachment slot defined in said attachment portion, further comprising a fastening band mounted in said attachment slot for fastening said bellows-shaped boot to said housing.

8. A boot structure in combination with a rotary joint, comprising:

a rotary joint comprising a housing and a shaft;

a bellows-shaped boot adapted to be installed on said housing and said shaft of the rotary joint;

an attachment portion of said bellows-shaped boot being mounted on an outer circumferential surface of said shaft;

the outer circumferential surface of said shaft including a first large-diameter circumferential surface area, a toothed surface area composed of circumferential teeth and circumferential grooves, and a second large-diameter circumferential surface area engageable by a tip end of said attachment portion of said bellows-shaped boot, said first large-diameter circumferential surface area, said toothed surface area and said second large-diameter circumferential surface area being successively arranged in that named order in a direction in which the bellows-shaped boot is installed onto the shaft; and an outside diameter of said shaft being disposed at said first large-diameter circumferential surface area which is at least equal to a smallest inside diameter of said bellows-shaped boot at the attachment portion thereof, said first large-diameter circumferential surface area, said circumferential teeth of the toothed surface area and said second large-diameter circumferential surface area having diameters that are progressively greater in that named order.

9. The combination according to claim 8, wherein said attachment portion of said bellows-shaped boot includes circumferential grooves and circumferential teeth defined on an inner circumferential surface thereof complementary to said circumferential grooves and said circumferential teeth of the toothed surface area of said shaft.

10. The combination according to claim 9, wherein one of said teeth of said bellows-shaped boot, positioned adjacent to another of said teeth of said bellows-shaped boot, has a slanted surface inclined rearwardly at a predetermined angle, said shaft having an engaging slanted surface extending between said first large-diameter circumferential surface area and one of said circumferential grooves of said toothed surface area, said engaging slanted surface being complementary to said slanted surface.

11. The combination according to claim 8, wherein said attachment portion of said bellows-shaped boot comprises a smooth inner circumferential surface having a constant inside diameter.

12. The combination according to claim 11, wherein said attachment portion has a thickness greater than a thickness of a radially slanted portion contiguous to said attachment portion.

13. The combination according to claim 8, wherein said bellows-shaped boot has a band attachment slot defined in said attachment portion, further comprising a fastening band mounted in said attachment slot for fastening said bellows-shaped boot to said shaft.

14. A boot structure in combination with a rotary joint, comprising:

a rotary joint comprising a housing and a shaft;

a bellows-shaped boot adapted to be installed on said housing and said shaft of the rotary joint;

two attachment portions of said bellows-shaped boot being mounted respectively on an outer circumferential surface of the housing and the shaft;

the outer circumferential surface of said housing including a circumferential surface area, a toothed surface area composed of circumferential teeth and circumferential grooves, and a stopper engageable by a tip end of one of said attachment portions of said bellows-shaped boot, said circumferential surface area, said toothed surface area and said stopper being successively arranged in that named order in a direction in which the bellows-shaped boot is installed onto the housing;

an outside diameter of said housing being disposed at said circumferential surface area which is at least equal to a smallest inside diameter of said bellows-shaped boot at the one attachment portion thereof, said circumferential surface area, said circumferential teeth of the toothed surface area and said stopper having diameters that are progressively greater in that named order;

the outer circumferential surface of said shaft including a first large-diameter circumferential surface area, a toothed surface area composed of circumferential teeth and circumferential grooves, and a second large-diameter circumferential surface area engageable by a tip end of the other attachment portion of said bellows-shaped boot, said first large-diameter circumferential surface area, said toothed surface area and said second large-diameter circumferential surface area being successively arranged in that named order in a direction in which the bellows-shaped boot is installed onto the shaft; and an outside diameter of said shaft being disposed at said first large-diameter circumferential surface area which is at least equal to a smallest inside diameter of said bellows-shaped boot at the other attachment portion thereof, said first large-diameter circumferential surface area, said circumferential teeth of the toothed surface area and said second large-diameter circumferential surface area having diameters that are progressively greater in that named order.

15. A boot structure in combination with a rotary joint, comprising:

a housing having, on an outer circumferential surface thereof, a circumferential surface area, a toothed surface area composed of circumferential teeth and grooves, and a stopper engageable by a tip end of an attachment portion of a bellows-shaped boot, said circumferential surface area, said toothed surface area and said stopper being successively arranged in that named order in a direction in which the bellows-shaped boot is installed onto the housing and having diameters that are progressively greater in that named order; and a shaft having, on an outer circumferential surface thereof, a first large-diameter circumferential surface area, a toothed surface area composed of circumferential teeth and grooves, and a second large-diameter circumferential surface area engageable by a tip end of another attachment portion of said bellows-shaped boot, said first large-diameter circumferential surface area, said toothed surface area and said second large-diameter circumferential surface area being successively arranged in that named order in a direction in which said bellows-shaped boot is installed onto the shaft and having diameters that are progressively greater in that named order.

16. A method of selecting a boot and fitting the selected boot to a rotary joint, said rotary joint comprising:

a housing having, on an outer circumferential surface thereof, a circumferential surface area, a toothed surface area composed of circumferential teeth and grooves, and a stopper engageable by a tip end of said attachment portion of a bellows-shaped boot, said circumferential surface area, said toothed surface area and said stopper being successively arranged in that named order in the direction in which the bellows-shaped boot is installed onto the housing and having diameters that are progressively greater in that named order; and a shaft having, on an outer circumferential surface thereof, a first large-diameter circumferential surface area, a toothed surface area composed of circumferential teeth and grooves, and a second large-diameter circumferential surface area engageable by a tip end of another attachment portion of said bellows-shaped boot, said first large-diameter circumferential surface area, said toothed surface area and said second large-diameter circumferential surface area being successively arranged in that named order in a direction in which said bellows-shaped boot is installed onto the shaft and having diameters that are progressively greater in that named order;

said method comprising the steps of:

providing first and second bellows-shaped boots of different configurations, each of said bellows-shaped boots having respective attachment portions to be mounted on the outer circumferential surfaces of the housing and the shaft, wherein said attachment portions of said first bellows-shaped boot have circumferential grooves and circumferential teeth defined on an inner circumferential surface thereof complementary to said circumferential grooves and said circumferential teeth of the toothed surface area of said housing and said shaft, respectively, and wherein said attachment portions of said second bellows-shaped boot comprise smooth inner circumferential surfaces having respective constant inside diameters;

selecting one of said first and second bellows-shaped boots; and fitting the selected bellows-shaped boot on the housing and the shaft of said rotary joint.

* * * * *